UNITED STATES PATENT OFFICE.

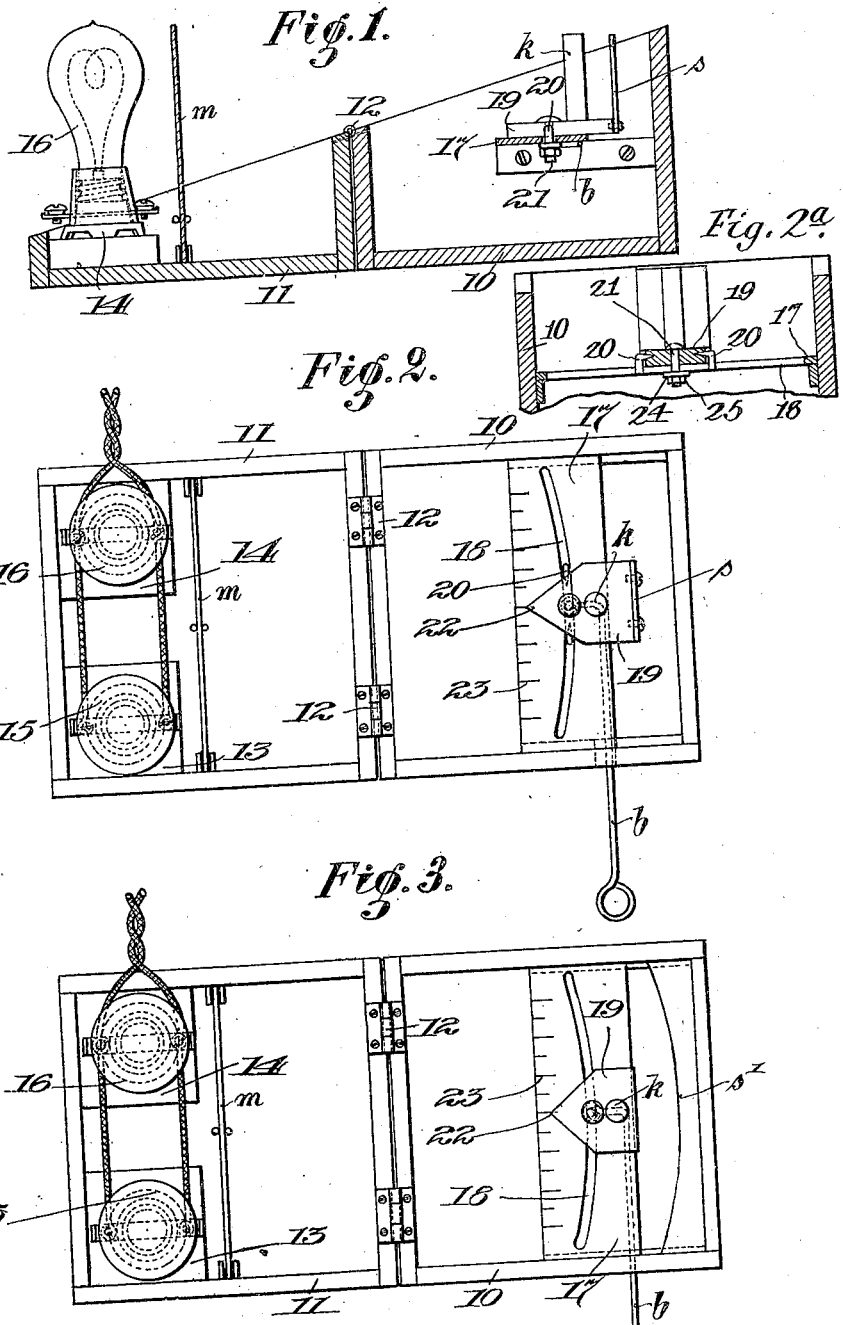

WILHELM HERRMANN, OF DUSSELDORF, GERMANY, ASSIGNOR TO LAND-UND SEEKABEL-WERKE AKTIENGESELLSCHAFT, OF COLOGNE-NIPPES, GERMANY.

PHOTOMETER.

No. 922,583.          Specification of Letters Patent.          Patented May 25, 1909.

Application filed September 19, 1908. Serial No. 453,877.

*To all whom it may concern:*

Be it known that I, WILHELM HERRMANN, a citizen of Germany, residing at Dusseldorf, Germany, have invented new and useful Improvements in Photometers, of which the following is a specification.

This invention relates to an improved photometer for ascertaining, in a quick and reliable manner, the luminous intensity of electric lamps.

In the accompanying drawing: Figure 1 is a vertical longitudinal section of my improved photometer; Fig. 2 a plan thereof, Fig. 2ª a vertical transverse section along the curved slot of the photometer, and Fig. 3 a plan of a modification of the photometer.

The upper and lower sections 10 and 11 of a box or case are connected by hinges 12. Within lower section 11 are fitted a pair of sockets 13, 14 for the reception of a pair of electric lamps 15, 16, one of which, say lamp 15 is of normal candle power, while lamp 16 is to be tested. In front of sockets 13, 14 there is a ground glass window $m$, for obtaining a more uniform diffusion of the light. Within section 10 of the casing is contained a raised plate 17 provided with a slot 18 which is of elliptic shape, being struck with the centers of sockets 13, 14 as foci. Upon plate 17 there is movable a slide 19 which may be manipulated by a handle $b$. Slide 19 is guided along slot 18 by means of a pair of lateral prongs 20 extending downwardly from the slide into said slot, any disengagement of the slide from plate 17 being prevented by a screw bolt 21 secured to slide 19 and carrying a washer 24 and a nut 25. From the slide there extends upwardly a post $k$, and a screem $s$, back of said post. By moving slide 19 along slot 18, the slide will be so turned or guided that screen $s$, will always assume a position parallel to a tangent of the curve formed by the slot. The forward end of slide 19 runs out into a pointer 22 moving along a scale 23, which is formed on the forward edge of support 17.

In use, the slide is so manipulated that the two shadows of post $k$, cast by lamps 15, 16, upon screen $s$, will have the same depth, when the excess or deficiency of candle power of lamp 16, to be tested, may be ascertained on scale 23.

As screen $s$, is turned by the movement of the slide relatively to lamp 15 or 16, the rays of both lamps will always incide at the same angle on the screen, so that the umbra of the post shadow will not be unduly extended when the slide is moved away from the center of the scale. In this way the width and intensity of such shadows will always be uniform, so that an accurate reading may be obtained.

In Fig. 3, the screen $s'$, is arranged stationary within box-section 10, back of slide 19. The screen is curved concentric to slot 18, so that here also the screen is in all positions of the slide, in substantial parallelism with the slot.

I claim:

1. A photometer, comprising a pair of sockets, a plate having a curved slot, a slide guided within said slot, a post on the slide, and a screen back of the post, substantially as specified.

2. A photometer, comprising a pair of sockets, a plate having a curved slot, a slide guided within said slot, a post on the slide, and a screen back of the post, said screen being, during all positions of the slide, in substantial parallelism with the slot, as specified.

3. A photometer, comprising a pair of sockets, a ground glass window in front thereof, a plate having a curved slot, a slide guided within said slot, a post on the slide, and a screen back of the post, substantially as specified.

Signed by me at Cologne, Germany, this 7th day of September 1908.

WILHELM HERRMANN.

Witnesses:
     LOUIS VANDORN,
     H. STELZER.